United States Patent
Sunstrom et al.

(10) Patent No.: US 6,465,128 B1
(45) Date of Patent: Oct. 15, 2002

(54) METHOD OF MAKING A CATHODE OR BATTERY FROM A METAL NAPTHENATE

(75) Inventors: Joseph Sunstrom, New Milford, CT (US); Jack Treger, Quincy, MA (US)

(73) Assignee: The Gillette Company, Boston, MA (US)

( * ) Notice: Subject to any disclaimer, the term of this patent is extended or adjusted under 35 U.S.C. 154(b) by 106 days.

(21) Appl. No.: 09/632,172

(22) Filed: Aug. 3, 2000

(51) Int. Cl.[7] ................................................ H01M 4/26
(52) U.S. Cl. ..................... 429/218.1; 429/213
(58) Field of Search .............................. 429/218.1, 213, 429/215

(56) References Cited

U.S. PATENT DOCUMENTS

| | | |
|---|---|---|
| 3,754,975 A | 8/1973 | Spiller |
| 3,770,508 A | 11/1973 | Sandler |
| 3,919,345 A | 11/1975 | Labana |
| 4,202,789 A | 5/1980 | Saridakis |
| 4,211,848 A | 7/1980 | Blount |
| 4,376,691 A | 3/1983 | Lindstrom |
| 4,568,493 A | 2/1986 | Marraccini et al. |
| 4,950,643 A | 8/1990 | Agostinelli et al. |
| 5,432,022 A | 7/1995 | Cheiky |
| 5,474,800 A | 12/1995 | Matsuzaki |
| 5,914,094 A | 6/1999 | Sun et al. |
| 5,948,565 A | 9/1999 | Kelder |
| 5,984,982 A | 11/1999 | Wei et al. |
| 5,995,359 A | 11/1999 | Klee et al. |
| 6,027,826 A | 2/2000 | deRochemont et al. |

FOREIGN PATENT DOCUMENTS

| | | |
|---|---|---|
| EP | 0 809 314 A2 | 11/1997 |
| EP | 0 955 685 A1 | 11/1999 |
| EP | 0 987 776 A1 | 3/2000 |
| JP | 52 119478 | 10/1977 |

*Primary Examiner*—Gabrielle Brouillette
*Assistant Examiner*—M. Wills
(74) *Attorney, Agent, or Firm*—Fish & Richardson P.C.

(57) ABSTRACT

A method of making a cathode includes decomposing a mixture comprising a metal naphthenate, e.g., cobalt naphthenate, and incorporating the decomposed mixture into the cathode. The cathode can be used, for example, in a metal-air battery and a fuel cell.

22 Claims, 1 Drawing Sheet

FIGURE
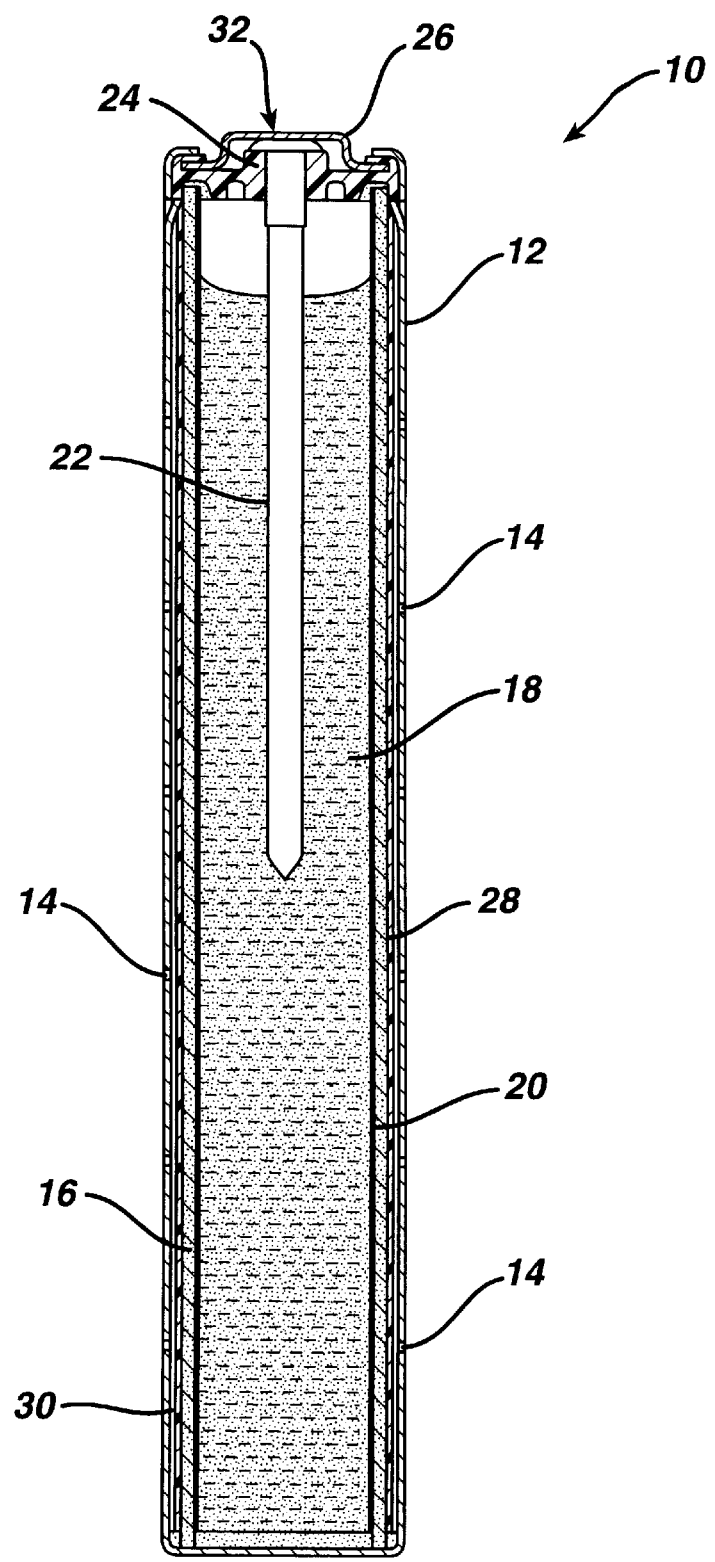

METHOD OF MAKING A CATHODE OR BATTERY FROM A METAL NAPTHENATE

BACKGROUND

This invention relates to cathodes for batteries.

Batteries are commonly used electrical energy sources. A battery contains a negative electrode, typically called the anode, and a positive electrode, typically called the cathode. The anode contains an active material that can be oxidized; the cathode contains or consumes an active material that can be reduced. The anode active material is capable of reducing the cathode active material. In order to prevent direct reaction of the anode material and the cathode material, the anode and the cathode are electrically isolated from each other by a separator.

When a battery is used as an electrical energy source in a device, such as a cellular telephone, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

In a metal-air electrochemical cell, oxygen is reduced to hydroxide ions at the cathode, and a metal, e.g., zinc, is oxidized at the anode. Oxygen is supplied to the cathode from the atmospheric air external to the cell through one or more air access opening(s) in the cell container.

A cathode material used for oxygen reduction in zinc-air cells includes a metal oxide catalyst (e.g., manganese dioxide) dispersed on carbon (a support). It is believed that the carbon reduces oxygen ($O_2$) to peroxide ($O_2H^-$), while the catalyst decomposes peroxide ($O_2H^-$) to oxygen ($O_2$) and hydroxide ($OH^-$). Because the two-step reduction process involves diffusion of peroxide from the carbon to the catalyst, it is generally desirable for the catalyst to be dispersed highly and evenly on the carbon. For example, a low dispersion of the oxide on carbon can lower the discharge rate of the cathode. Moreover, the buildup of peroxide can decrease the running voltage and limiting current of the cathode.

SUMMARY

The invention relates to cathode active materials formed from metal naphthenate precursors, such as cobalt naphthenate. A catalyst such as cobalt and/or cobalt oxide is believed to be capable of reducing oxygen to hydroxide without formation of peroxide, as well as reducing peroxide to oxygen and hydroxide. The precursors provide a cost-effective method of forming highly-dispersed, finely-divided metal/metal oxide on a support, e.g., carbon. Furthermore, when incorporated into a battery, the cathode active materials generally provide the battery with high limiting current and high running voltage.

In one aspect, the invention features a method of making a cathode including decomposing a mixture comprising a metal naphthenate and incorporating the decomposed mixture into the cathode. The mixture can further include carbon and a non-aqueous solvent, e.g., acetone or alkanes.

Embodiments of the invention may include one or more of the following features. Decomposing the mixture can be performed by evaporating the non-aqueous solvent, heating the mixture to about 50° C. to about 70° C., and/or contacting the metal naphthenate with a chemical reducing agent. Incorporating the decomposed mixture into the cathode may include incorporating carbon and a binder, e.g., polytetrafluoroethylene, into the cathode.

In another aspect, the invention features a method of making a battery including forming a solution comprising a metal naphthenate and carbon in a solvent, removing the solvent, and decomposing the metal naphthenate to form a metal oxide dispersed on the carbon. The decomposed naphthenate can be incorporated into a cathode, which can be incorporated into a metal-air battery or into an electrode of a fuel cell.

In another aspect, the invention features a method of making a cathode including decomposing a metal naphthenate and incorporating the decomposed naphthenate into the cathode. The metal naphthenate can include cobalt naphthenate.

Other features, objects, and advantages of the invention will be apparent from the description and drawings, and from the claims.

DESCRIPTION OF DRAWINGS

The FIGURE is an elevational, cross-sectional view of a metal-air battery.

DETAILED DESCRIPTION

Referring to the FIGURE, cylindrical metal-air battery 10 includes a housing 12 having air access openings 14, a cathode tube 16, an anode 18, and a separator 20 between cathode tube 16 and anode 18. Battery 10 further includes an anode current collector 22, a seal assembly 24, and a metal top cap 26.

Cathode tube 16 is a blend of a catalyst, carbon particles and a binder.

The catalyst is made of finely-divided particles of metal and/or metal oxide highly dispersed on a support such as carbon. The metal and/or metal oxide is preferably formed from an organometallic precursor. Generally, the organometallic precursor and a support (e.g., carbon) are mixed with a solvent to form a solution. The solvent can be aqueous or non-aqueous. Preferably, the solvent can dissolve the precursor or is miscible with the precursor. The solution is mixed to allow the precursor to sorb to the support. The solvent is then removed, and the remaining precursor/support mixture is decomposed to provide a metal and/or metal oxide/support mixture that can be used in cathode 16. A preferred catalyst is cobalt and/or cobalt oxide finely dispersed on carbon formed from a cobalt naphthenate precursor. Cathode 16 includes between about 1% and about 10%, preferably between about 3% and about 5% of catalyst by weight.

An example of a catalyst supported on carbon was prepared according to the following procedure. Fifty gram of cobalt naphthenate (commercially available suspended in mineral spirits from Alfa Aesar) was dissolved in 1 L of acetone at about 50–60° C. One hundred gram of carbon (Vulcan XC-72, Cabot Corp.) was stirred into the naphthenate/acetone solution. The solution was covered and stirred for 24 hours to allow distribution of the cobalt naphthenate into the pores of the carbon. After 24 hours, the cover was removed, and the acetone was allowed to evaporate slowly until the acetone volume was reduced in half. The remaining solution was poured into a stainless steel pan and placed for 8 hours in a furnace heated at 70° C. to remove the remaining acetone. The temperature was then raised to 260° C. for 8 hours to remove the mineral spirits base. The resulting cobalt/cobalt oxide/carbon cake was pulverized in a Waring blender and incorporated into cathode 16.

The carbon is not limited to any particular type of carbon. Examples of carbon include Black Pearls 2000, Vulcan XC-72 (Cabot Corp., Billerica, Mass.), Shawinigan Black (Chevron, San Francisco, Calif.), Printex, Ketjen Black (Akzo Nobel, Chicago, Ill.), and Calgon PWA (Calgon Carbon, Pittsburgh, Pa.). Generally, cathode 16 includes between about 30% and about 70%, preferably between about 50% and about 60%, of total carbon by weight.

Examples of binders include polyethylene powders, polyacrylamides, Portland cement and fluorocarbon resins, such as polyvinylidene fluoride and polytetrafluoroethylene. An example of a polyethylene binder is sold under the tradename Coathylene HA-1681 (Hoechst). A preferred binder includes polytetrafluoroethylene (PTFE) particles. Generally, cathode 16 includes between about 10% and 40%, preferably between about 30% and about 40%, of binder by weight.

The active cathode coating mixture, as described above, is coated on a current collector (not shown), e.g., a metal mesh screen, to form cathode tube 16. After the cathode coating mixture has hardened, the cathode assembly can be heated to remove any residual volatiles from the cathode structure.

The outside of tube 16, which faces battery openings 14, can be covered by a PTFE barrier membrane 28. Membrane 28 helps maintain a consistent humidity level in battery 10. Membrane 28 also helps to prevent the electrolyte from leaking out of the cell and $CO_2$ from leaking into the cell.

A separator 20 is placed in cathode tube 16. Separator 20 can be a porous, electrically insulating polymer, such as polypropylene, that allows the electrolyte to contact the cathode.

To assemble battery 10, cathode tube 16, which is wrapped with barrier membrane 28 and includes separator 20, is placed in can 12. For sealing the cathode, can 12 may include a conductive hot melt (not shown), e.g., a polyamide loaded with carbon, graphite, or nickel. The cathode current collector should electrically contact the bottom of can 12. Electrical contact may be made by providing direct physical contact between the cathode current collector and the bottom of the can, for example, by welding the current collector to the bottom of the can. Alternatively, a conductive tab can be attached to both the current collector and to the bottom of the can. Cathode tube 16 and can 12 together define an air plenum 30 therebetween.

After cathode tube 16 is inserted, the inner cavity formed by separator 20 and cathode tube 16 is then filled with anode gel 18.

Anode gel 18 contains a mixture of zinc and electrolyte. The mixture of zinc and electrolyte can include a gelling agent that can help prevent leakage of the electrolyte from the cell and helps suspend the particles of zinc within the anode.

The zinc material can be a zinc powder that is alloyed with lead, indium, aluminum, or bismuth. For example, the zinc can be alloyed with between about 400 and 600 ppm (e.g., 500 ppm) of lead, between 400 and 600 ppm (e.g., 500 ppm) of indium, or between about 50 and 90 ppm (e.g., 70 ppm) aluminum. Preferably, the zinc material can include lead, indium and aluminum, lead and indium, or lead and bismuth. Alternatively, the zinc can include lead without another metal additive. The zinc material can be air blown or spun zinc. Suitable zinc particles are described, for example, in U.S. Ser. No. 09/156,915, filed Sep. 18, 1998, U.S. Ser. No. 08/905,254, filed Aug. 1, 1997, and U.S. Ser. No. 09/115,867, filed Jul. 15, 1998, each of which is incorporated by reference in its entirety.

The particles of the zinc can be spherical or nonspherical. For example, the zinc particles can be acicular in shape (having an aspect ratio of at least two). The zinc material includes a majority of particles having sizes between 60 mesh and 325 mesh. For example, the zinc material can have the following particle size distribution:

0–3 wt. % on 60 mesh screen;
40–60 on 100 mesh screen;
30–50 wt. % on 200 mesh screen;
0–3 wt. % on 325 mesh screen; and
0–0.5 wt. % on pan.

Suitable zinc materials include zinc available from Union Miniere (Overpelt, Belgium), Duracell (USA), Noranda (USA), Grillo (Germany), or Toho Zinc (Japan).

The gelling agent is an absorbent polyacrylate. The absorbent polyacrylate has an absorbency envelope of less than about 30 grams of saline per gram of gelling agent, measured as described in U.S. Pat. No. 4,541,871, incorporated herein by reference. The anode gel includes less than 1 percent of the gelling agent by dry weight of zinc in the anode mixture. Preferably the gelling agent content is between about 0.2 and 0.8 percent by weight, more preferably between about 0.3 and 0.6 percent by weight, and most preferably about 0.33 percent by weight. The absorbent polyacrylate can be a sodium polyacrylate made by suspension polymerization. Suitable sodium polyacrylates have an average particle size between about 105 and 180 microns and a pH of about 7.5. Suitable gelling agents are described, for example, in U.S. Pat. Nos. 4,541,871, 4,590,227, or 4,507,438.

In certain embodiments, the anode gel can include a non-ionic surfactant. The surfactant can be a non-ionic phosphate surfactant, such as a non-ionic alkyl phosphate or a non-ionic aryl phosphate (e.g., RA600 or RM510, available from Rohm & Haas) coated on a zinc surface. The anode gel can include between about 20 and 100 ppm of the surfactant coated onto the surface of the zinc material. The surfactant can serve as a gassing inhibitor.

The electrolyte can be an aqueous solution of potassium hydroxide. The electrolyte can include between about 30 and 40 percent, preferably between 35 and 40 of potassium hydroxide. The electrolyte can also include between about 1 and 2 percent of zinc oxide.

After anode gel 18 has been placed into can 12, a pre-assembled top assembly 32 is placed on the top of can 12. Top assembly 32 includes seal 24, current collector 22, and top cap 26 welded to current collector 22. Current collector 22 is made from a suitable metal, such as brass. Seal 24 can be made, for example, of nylon. Additional non-conductive hot melt (BiWax Corp.) is placed between seal 24 and cathode tube 16 to minimize leakage of the electrolyte and anode material. The upper external periphery (i.e., the lip) of can 12 is then swaged down over pre-assembled top assembly 32 to seal top assembly 32 at the top of can 12.

During storage, battery 10 can be covered with a removable sheet that covers battery openings 14. The sheet, for example, an oxygen-impermeable and hydrogen permeable sheet, restricts the flow of air between the interior and exterior of the battery. The user peels the sheet from the battery prior to use to allow oxygen from the air to enter the interior of the battery. The battery can also be stored in a sealed metal bag. The user removes the battery from the bag before use.

Other embodiments of metal-air batteries and methods of making them are described, in U.S. Ser. No. 09/374,277, filed Aug. 13, 1999 now U.S. Pat. No. 6,232,007; U.S. Ser. No. 09/374,278, filed Aug. 13, 1999 now U.S. Pat. No. 6,265,104; U.S. Ser. No. 09/416,799, filed Oct. 13, 1999; U.S. Ser. No. 09/427,371, filed Oct. 26, 1999; and U.S. Ser. No. 09/494,586, filed Jan. 31, 2000, all hereby incorporated by reference in their entirety.

Other embodiments are contemplated. For example, other metal naphthenates can be used, such as manganese naphthenate, nickel naphthenate, and iron naphthenate. The metal naphthenates can be decomposed by chemical reduction to form particles of metals that can be oxidized by air. Reducing agents include, for example, hydrazine, hydroxylamine, aluminum borohydride and lithium aluminum hydride. Furthermore, while the above description relates to metal-air batteries, cathode 16 can be applied to other types of batteries, including air restored batteries and fuel cells.

Other embodiments are within the claims.

What is claimed is:

1. A method of making a cathode, the method comprising:
   decomposing a mixture comprising a metal naphthenate; and
   incorporating the decomposed mixture into the cathode.

2. The method of claim 1, wherein the mixture further comprises carbon and a non-aqueous solvent.

3. The method of claim 2, wherein the mixture comprises:
   about 1 to about 10 percent by weight of the metal naphthenate; and
   about 30 to about 70 percent by weight of carbon.

4. The method of claim 2, wherein the solvent is selected from a group consisting of acetone and alkanes.

5. The method of claim 2, wherein decomposing the mixture comprises evaporating the non-aqueous solvent.

6. The method of claim 1, wherein decomposing the mixture comprises heating the mixture to about 200° C. to about 300° C.

7. The method of claim 1, wherein decomposing the mixture comprises contacting the metal naphthenate with a chemical reducing agent.

8. The method of claim 7, wherein the chemical reducing agent is selected from a group consisting of sodium borohydride, lithium aluminum hydride, hydrazine, and hydroxylamine.

9. The method of claim 1, wherein the metal comprises cobalt.

10. The method of claim 1, wherein the metal is selected from a group consisting of manganese, iron, and nickel.

11. The method of claim 1, wherein incorporating the decomposed mixture into the cathode comprises incorporating carbon and a binder into the cathode.

12. The method of claim 11, wherein the binder comprises polytetrafluoroethylene.

13. A cathode made according to the method of claim 1.

14. A method of making a battery, the method comprising:
   forming a solution comprising a metal naphthenate and carbon in a solvent;
   removing the solvent; and
   decomposing the metal naphthenate to form a metal oxide dispersed on the carbon.

15. The method of claim 14, wherein the metal naphthenate comprises cobalt naphthenate.

16. The method of claim 14, wherein decomposing the metal naphthenate comprises heating the naphthenate to a temperature greater than about 250° C.

17. The method of claim 14, further comprising incorporating the decomposed naphthenate into a cathode.

18. The method of claim 17, further comprising incorporating the cathode into a metal-air battery.

19. The method of claim 17, further comprising incorporating an anode comprising zinc into the metal-air battery.

20. The method of claim 14, further comprising incorporating the decomposed naphthenate into an electrode of a fuel cell.

21. A method of making a cathode, the method comprising:
   decomposing a metal naphthenate; and
   incorporating the decomposed metal naphthenate into the cathode.

22. The method of claim 21, wherein the metal naphthenate comprises cobalt napthenate.

* * * * *